United States Patent
Fan et al.

(10) Patent No.: US 8,332,394 B2
(45) Date of Patent: Dec. 11, 2012

(54) SYSTEM AND METHOD FOR PROVIDING QUESTION AND ANSWERS WITH DEFERRED TYPE EVALUATION

(75) Inventors: James Fan, Parsippany, NJ (US); David Ferrucci, Yorktown Heights, NY (US); David C. Gondek, Astoria, NY (US); Wlodek W. Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/126,642

(22) Filed: May 23, 2008

(65) Prior Publication Data

US 2009/0292687 A1    Nov. 26, 2009

(51) Int. Cl.
G06F 7/00 (2006.01)
G06F 17/30 (2006.01)

(52) U.S. Cl. ........................................................ 707/723
(58) Field of Classification Search ................. None
See application file for complete search history.

(56) References Cited

U.S. PATENT DOCUMENTS

| | | |
|---|---|---|
| 3,559,995 A | 2/1971 | Steadman |
| 4,594,686 A | 6/1986 | Yoshida |
| 4,599,691 A | 7/1986 | Sakaki et al. |
| 4,829,423 A | 5/1989 | Tennant et al. |
| 4,921,427 A | 5/1990 | Dunn |
| 5,384,894 A | 1/1995 | Vassiliadis et al. |
| 5,414,797 A | 5/1995 | Vassiliadis et al. |
| 5,513,116 A | 4/1996 | Buckley et al. |
| 5,546,316 A | 8/1996 | Buckley et al. |
| 5,550,746 A | 8/1996 | Jacobs |
| 5,559,714 A | 9/1996 | Banks et al. |
| 5,677,993 A | 10/1997 | Ohga et al. |
| 5,726,898 A | 3/1998 | Jacobs |
| 5,768,142 A | 6/1998 | Jacobs |

(Continued)

FOREIGN PATENT DOCUMENTS

EP    0 513 638    11/1992

(Continued)

OTHER PUBLICATIONS

Aditya Kalyanpur, Leveraging community-built knowledge for type Coercion in question Answering, issued in Semanticweb.org/fileadmin/iswc/paper, in 2011.*

(Continued)

*Primary Examiner* — Loan T Nguyen
(74) *Attorney, Agent, or Firm* — Scully, Scott, Murphy & Presser, P.C.; William Stock, Esq.

(57) ABSTRACT

A system, method and computer program product for conducting questions and answers with deferred type evaluation based on any corpus of data. The method includes processing a query including waiting until a "Type" is determined AND a candidate answer is provided; the Type is not required as part of a predetermined ontology but is a lexical/grammatical item. Then, a search is conducted for evidence that the candidate answer has the required LAT (e.g., as determined by a matching function leveraging a parser, a semantic interpreter and/or a pattern matcher). Alternately, the LAT may be matched to a known Ontological Type and then a candidate answer searched in an knowledge-base or database determined by that type. Then, all the evidence from all the different ways to determine that the candidate answer has the expected lexical answer type (LAT) is combined and one or more answers provided.

18 Claims, 4 Drawing Sheets

U.S. PATENT DOCUMENTS

| | | |
|---|---|---|
| 5,873,056 A | 2/1999 | Liddy et al. |
| 5,875,110 A | 2/1999 | Jacobs |
| 6,275,788 B1 | 8/2001 | Watanabe et al. |
| 6,336,029 B1 | 1/2002 | Ho et al. |
| 6,480,698 B2 | 11/2002 | Ho et al. |
| 6,487,545 B1 | 11/2002 | Wical |
| 6,498,921 B1 | 12/2002 | Ho et al. |
| 6,501,937 B1 | 12/2002 | Ho et al. |
| 6,571,240 B1 | 5/2003 | Ho et al. |
| 6,584,464 B1 | 6/2003 | Warthen |
| 6,584,470 B2 | 6/2003 | Veale |
| 6,631,377 B2 | 10/2003 | Kuzumaki |
| 6,665,666 B1 | 12/2003 | Brown et al. |
| 6,701,322 B1 | 3/2004 | Green |
| 6,732,090 B2 | 5/2004 | Shanahan et al. |
| 6,778,979 B2 | 8/2004 | Grefenstette et al. |
| 6,816,858 B1 | 11/2004 | Coden et al. |
| 6,820,075 B2 | 11/2004 | Shanahan et al. |
| 6,829,603 B1 | 12/2004 | Chai et al. |
| 6,829,605 B2 | 12/2004 | Azzam |
| 6,859,800 B1 | 2/2005 | Roche et al. |
| 6,865,370 B1 | 3/2005 | Ho et al. |
| 6,928,425 B2 | 8/2005 | Grefenstette et al. |
| 6,928,432 B2 | 8/2005 | Fagan et al. |
| 6,947,885 B2 | 9/2005 | Bangalore et al. |
| 6,957,213 B1 | 10/2005 | Yuret |
| 6,983,252 B2 | 1/2006 | Matheson et al. |
| 6,993,517 B2 | 1/2006 | Naito et al. |
| 7,007,104 B1 | 2/2006 | Lewis et al. |
| 7,031,951 B2 | 4/2006 | Mancisidor et al. |
| 7,051,014 B2 | 5/2006 | Brill et al. |
| 7,058,564 B2 | 6/2006 | Ejerhed |
| 7,117,432 B1 | 10/2006 | Shanahan et al. |
| 7,120,574 B2 | 10/2006 | Troyanova et al. |
| 7,133,862 B2 | 11/2006 | Hubert et al. |
| 7,136,909 B2 | 11/2006 | Balasuriya |
| 7,139,752 B2 | 11/2006 | Broder et al. |
| 7,149,732 B2 | 12/2006 | Wen et al. |
| 7,152,057 B2 | 12/2006 | Brill et al. |
| 7,171,351 B2 | 1/2007 | Zhou |
| 7,177,798 B2 | 2/2007 | Hsu et al. |
| 7,194,455 B2 | 3/2007 | Zhou et al. |
| 7,197,739 B2 | 3/2007 | Preston et al. |
| 7,206,780 B2 | 4/2007 | Slackman |
| 7,209,923 B1 | 4/2007 | Cooper |
| 7,216,073 B2 | 5/2007 | Lavi et al. |
| 7,236,968 B2 | 6/2007 | Seki et al. |
| 7,246,087 B1 | 7/2007 | Ruppelt et al. |
| 7,249,127 B2 | 7/2007 | Azzam |
| 7,266,537 B2 | 9/2007 | Jacobsen et al. |
| 7,269,545 B2 | 9/2007 | Agichtein et al. |
| 7,293,015 B2 | 11/2007 | Zhou |
| 7,299,228 B2 | 11/2007 | Cao et al. |
| 7,313,515 B2 | 12/2007 | Crouch et al. |
| 2001/0032211 A1 | 10/2001 | Kuzumaki |
| 2001/0053968 A1* | 12/2001 | Galitsky et al. .................. 704/9 |
| 2003/0033287 A1 | 2/2003 | Shanahan et al. |
| 2003/0220890 A1 | 11/2003 | Okude |
| 2004/0049499 A1* | 3/2004 | Nomoto et al. ................... 707/3 |
| 2004/0064305 A1 | 4/2004 | Sakai |
| 2004/0122660 A1 | 6/2004 | Cheng et al. |
| 2004/0243645 A1 | 12/2004 | Broder et al. |
| 2004/0254917 A1 | 12/2004 | Brill et al. |
| 2005/0033711 A1 | 2/2005 | Horvitz et al. |
| 2005/0060301 A1 | 3/2005 | Seki et al. |
| 2005/0086045 A1 | 4/2005 | Murata |
| 2005/0086222 A1 | 4/2005 | Wang et al. |
| 2005/0114327 A1 | 5/2005 | Kumamoto et al. |
| 2005/0143999 A1 | 6/2005 | Ichimura |
| 2005/0256700 A1* | 11/2005 | Moldovan et al. ................ 704/9 |
| 2006/0053000 A1 | 3/2006 | Moldovan et al. |
| 2006/0106788 A1 | 5/2006 | Forrest |
| 2006/0122834 A1 | 6/2006 | Bennett |
| 2006/0141438 A1 | 6/2006 | Chang et al. |
| 2006/0173834 A1 | 8/2006 | Brill et al. |
| 2006/0204945 A1 | 9/2006 | Masuichi et al. |
| 2006/0206472 A1 | 9/2006 | Masuichi et al. |
| 2006/0206481 A1 | 9/2006 | Ohkuma et al. |
| 2006/0235689 A1* | 10/2006 | Sugihara et al. .............. 704/257 |
| 2006/0277165 A1 | 12/2006 | Yoshimura et al. |
| 2006/0282414 A1 | 12/2006 | Sugihara et al. |
| 2006/0294037 A1 | 12/2006 | Horvitz et al. |
| 2007/0022099 A1 | 1/2007 | Yoshimura et al. |
| 2007/0022109 A1 | 1/2007 | Imielinski et al. |
| 2007/0073683 A1 | 3/2007 | Kobayashi et al. |
| 2007/0078842 A1 | 4/2007 | Zola et al. |
| 2007/0094285 A1 | 4/2007 | Agichtein et al. |
| 2007/0118519 A1 | 5/2007 | Yamasawa et al. |
| 2007/0124291 A1 | 5/2007 | Hassan et al. |
| 2007/0136246 A1 | 6/2007 | Stenchikova et al. |
| 2007/0196804 A1 | 8/2007 | Yoshimura et al. |
| 2007/0203863 A1 | 8/2007 | Gupta et al. |
| 2008/0077570 A1 | 3/2008 | Tang et al. |
| 2009/0192966 A1* | 7/2009 | Horvitz et al. ................... 706/46 |
| 2010/0100546 A1* | 4/2010 | Kohler ........................... 707/739 |

FOREIGN PATENT DOCUMENTS

| | | |
|---|---|---|
| EP | 1 284 461 | 2/2003 |
| EP | 1 391 834 | 2/2004 |
| EP | 1 653 379 | 5/2006 |
| EP | 1 793 318 | 5/2008 |
| WO | WO 2006/042028 | 4/2006 |

OTHER PUBLICATIONS

Philipp et al., Ontologies and lexical Semantics in natural language understanding, issued Course at the ESSLLI Summer School—Aug. 2007.*

Ittycheriah, A. et al, entitled "{IBM}'s Statistical Question Answering System—{TREC}—Text {REtrieval} Conference" in 2001 at ttp://citeseer.ist.psu.edu/cache/papers/cs2/7/http:zSzzSztrec.nist.govzSzpubszSztrec10zSz.zSzpaperszSztrec2001.pdf/ittycheriah01ibms.pdf).

"Question Answering", Wikipedia, the free encyclopedia, http://en.wikipedia.org/wiki/Question_answering, last printed May 20, 2008.

Gotz, et al., "Design and implementation of the UIM, Analysis System", IBM Systems Journal, vol. 43, No. 3, 2004, http://www.research.ibm.com/journal/sj/433/gotz.html, last printed May 20, 2008, pp. 1-13.

Bontcheva, et al., "Shallow Methods for Named Entity Coreference Resolution", TALN 2002, Nancy, Jun. 24-27, 2002.

2. Pasca, "Question-Driven Semantic Filters for Answer Retrieval", International Journal of Pattern Recognition and Artificial Intelligence (IJPRAI), World Scientific Publishing, SI, vol. 17, No. 5, Aug. 1, 2003, pp. 741-756.

3. Cucerzan et al., "Factoid Question Answering over Unstructured and Structured Web Content", In Proceedings of the 14th Text Retrieval Conference TREC 2005, Dec. 31, 2005.

Molla et al., "AnswerFinder at TREC 2004", Proceedings of the 13th Text Retrieval Conference TREC 2004, Dec. 31, 2004.

Search Report dated Sep. 30, 2011 received from the European Patent Office.

* cited by examiner

SYSTEM AND METHOD FOR PROVIDING QUESTION AND ANSWERS WITH DEFERRED TYPE EVALUATION

CROSS-REFERENCE TO RELATED APPLICATIONS

The present invention relates to commonly-owned, United States Patent Application No. 12/152,441, filed May 14, 2008, the entire contents and disclosure of which is incorporated by reference as if fully set forth herein.

BACKGROUND

1. Field of the Invention

The invention relates generally to information retrieval systems, and more particularly, the invention relates to a novel query/answer system and method for open domains implementing a deferred type evaluation of candidate answers.

2. Description of the Related Art

An introduction to the current issues and approaches of Questions and Answering (QA) can be found in the web-based reference http:/en.wikipedia.org/wiki/Question_answering. Generally, question answering is a type of information retrieval. Given a collection of documents (such as the World Wide Web or a local collection) the system should be able to retrieve answers to questions posed in natural language. QA is regarded as requiring more complex natural language processing (NLP) techniques than other types of information retrieval such as document retrieval, and it is sometimes regarded as the next step beyond search engines.

QA research attempts to deal with a wide range of question types including: fact, list, definition, How, Why, hypothetical, semantically-constrained, and cross-lingual questions. Search collections vary from small local document collections, to internal organization documents, to compiled newswire reports, to the world wide web.

Closed-domain question answering deals with questions under a specific domain (for example, medicine or automotive maintenance), and can be seen as an easier task because NLP systems can exploit domain-specific knowledge frequently formalized in ontologies. Open-domain question answering deals with questions about nearly everything, and can only rely on general ontologies and world knowledge. On the other hand, these systems usually have much more data available from which to extract the answer.

Alternatively, closed-domain might refer to a situation where only a limited type of questions are accepted, such as questions asking for descriptive rather than procedural information.

Access to information is currently dominated by two paradigms: a database query that answers questions about what is in a collection of structured records; and, a search that delivers a collection of document links in response to a query against a collection of unstructured data (text, html etc.).

One major unsolved problem in such information query paradigms is the lack of a computer program capable of answering factual questions based on information included in a collection of documents (of all kinds, structured and unstructured). Such questions can range from broad such as "what are the risks of vitamin K deficiency" to narrow such as "when and where was Hillary Clinton's father born".

The challenge is to understand the query, to find appropriate documents that might contain the answer, and to extract the correct answer to be delivered to the user. Currently, understanding the query is an open problem because computers do not have human ability to understand natural language nor do they have common sense to choose from many possible interpretations that current (very elementary) natural language understanding systems can produce.

In the patent literature, U.S. Patent Publication Nos. 2007/0203863A1, U.S. 2007/0196804 A1, U.S. Pat. No. 7,236,968 and EP Patent No. 1797509 A2 describe generally the state of the art in QA technology.

U.S. Patent Pub. No. 2007/0203863 A1 entitled "Meta earning for question classification" describes a system and a method are disclosed for automatic question classification and answering. A multipart artificial neural network (ANN) comprising a main ANN and an auxiliary ANN classifies a received question according to one of a plurality of defined categories. Unlabeled data is received from a source, such as a plurality of human volunteers. The unlabeled data comprises additional questions that might be asked of an autonomous machine such as a humanoid robot, and is used to train the auxiliary ANN in an unsupervised mode. The unsupervised training can comprise multiple auxiliary tasks that generate labeled data from the unlabeled data, thereby learning an underlying structure. Once the auxiliary ANN has trained, the weights are frozen and transferred to the main ANN. The main ANN can then be trained using labeled questions. The original question to be answered is applied to the trained main ANN, which assigns one of the defined categories. The assigned category is used to map the original question to a database that most likely contains the appropriate answer. An object and/or a property within the original question can be identified and used to formulate a query, using, for example, system query language (SQL), to search for the answer within the chosen database. The invention makes efficient use of available information, and improves training time and error rate relative to use of single part ANNs.

U.S. Patent Publication No. 2007/0196804 A1 entitled "Question-answering system, question-answering method, and question-answering program" describes a question-answering system that is formed with an information processing apparatus for processing information in accordance with a program, and obtains an answer to an input search question sentence by searching a knowledge source, includes: a background information set; a first answer candidate extracting unit; a first background information generating unit; an accuracy determining unit; and a first background information adding unit.

U.S. Pat. No. 7,236,968 entitled "Question-answering method and question-answering apparatus" describes a question document is divided into predetermined areas, and it is judged whether each divided area is important, to thereby extract an important area. A reply example candidate likelihood value is calculated for each important area, the likelihood value indicating the degree representative of whether each reply example candidate corresponds to a question content. By using the reply example candidate likelihood value, important areas having similar meanings are combined to extract final important parts. A reply example candidate is selected for each important part from reply example candidates prepared beforehand. A reply example candidate reliability degree representative of certainty of each reply example candidate and a reply composition degree indicating whether it is necessary to compose a new reply are calculated, and by using these values, question documents are distributed to different operator terminals.

U.S. Pat. No. 7,216,073 provides a reference to question answering using natural language in addition to a comprehensive summary of prior art.

In the patent literature, U.S. Pat. No. 7,293,015 describes a method for retrieving answers to questions from an information retrieval system. The method involves automatically learning phrase features for classifying questions into different types, automatically generating candidate query transformations from a training set of question/answer pairs, and automatically evaluating the candidate transforms on information retrieval systems. At run time, questions are transformed into a set of queries, and re-ranking is performed on the documents retrieved.

In the patent literature, U.S. Pat. No. 7,313,515 describes techniques for detecting entailment and contradiction. Packed knowledge representations for a premise and conclusion text are determined comprising facts about the relationships between concept and/or context denoting terms. Concept and context alignments are performed based on alignments scores. A union is determined. Terms are marked as to their origin and conclusion text terms replaced with by corresponding terms from the premise text. Subsumption and specificity, instantiability, spatio-temporal and relationship based packed rewrite rules are applied in conjunction with the context denoting facts to remove entailed terms and to mark contradictory facts within the union. Entailment is indicated by a lack of any facts from the packed knowledge representation of the conclusion in the union. Entailment and contradiction markers are then displayed.

U.S. Pat. No. 7,299,228 describes a technique for extracting information from an information source. During extraction, strings in the information source are accessed. These strings in the information source are matched with generalized extraction patterns that include words and wildcards. The wildcards denote that at least one word in an individual string can be skipped in order to match the individual string to an individual generalized extraction pattern.

While the use of static ontologies (e.g., list of types and relations between them) is typical in some Question Answering systems, in a different but broadly related context of knowledge organization, the use of "dynamic ontologies," i.e. user customizable dictionaries of terms and relations.

One U.S. Pat. No. 6,487,545 describes a knowledge catalog including a plurality of independent and parallel static ontologies to accurately represent a broad coverage of concepts that define knowledge. The actual configuration, structure and orientation of a particular static ontology is dependent upon the subject matter or field of the ontology in that each ontology contains a different point of view. The static ontologies store all senses for each word and concept. A knowledge classification system, that includes the knowledge catalog, is also disclosed. A knowledge catalog processor accesses the knowledge catalog to classify input terminology based on the knowledge concepts in the knowledge catalog. Furthermore, the knowledge catalog processor processes the input terminology prior to attachment in the knowledge catalog. The knowledge catalog her includes a dynamic level that includes dynamic hierarchies. The dynamic level adds details for the knowledge catalog by including additional words and terminology, arranged in a hierarchy, to permit a detailed and in-depth coverage of specific concepts contained in a particular discourse. The static and dynamic ontologies are relational such that the linking of one or more ontologies, or portions thereof, result in a very detailed organization of knowledge concepts.

Both static and dynamic ontologies are given in advance of query processing. These methods have only limited effectiveness. The performance of current QA systems even on restricted corpora is not good enough to provide significant productivity improvement over search.

Being able to answer factual query is of potential great value for the society as it enables real time access to accurate information. Similarly, advancing the state of the art in question answering has great business value, since it provides a real time view of the business, its competitors, economic conditions, etc. Even if it is in a most elementary form, it can improve productivity of information workers by orders of magnitude.

It would be highly desirable to provide a computing infrastructure and methodology for conducting questions and answers.

SUMMARY OF THE INVENTION

The present invention addresses the needs described above by providing a dynamic infrastructure and methodology for conducting questions and answers with deferred type evaluation, wherein, instead of precomputing the answer type, decisions about the type of answer to a query are postponed until the candidate answer analysis phase. The crucial difference between the disclosed method and prior art can be expressed as "wait to do the matching until you know what type you're looking for instead of assigning ontological types of answers in advance".

The invention leverages the concept of "Lexical Answer Type" (LAT) not the "ontological answer type". While the two are related, ontologies are typically predefined (and finite), the LATs are computed from a natural language analysis of the query and provide more a description of an answer than its ontological category.

More formally, a LAT of the question/query is the descriptor of the referent or referents of the entity that is a valid answer to the question.

In accordance with one aspect of the invention, the infrastructure and methodology for conducting questions and answers with deferred type evaluation processes a query in a manner that includes the following: 1. waiting until a "Type" (i.e. the descriptor) is determined AND a candidate answer is provided; 2. Not to require that the Type is part of a predetermined ontology but is only a lexical/grammatical item; 3. To look (search) for evidence that the CandidateAnswer has the required LAT (e.g., as determined by a matching function that can leverage a parser, a semantic interpreter and/or a simple pattern matcher); where another method might be to try to match the LAT to a known Ontological Type and then look it up in a knowledge-base (KB), database (DB) or even try a NED (Named Entity Dictionary) on it; and, 4. To combine all the evidence from all the different ways to determine that the candidate answer has the expected lexical answer type (LAT).

In accordance with the invention, the infrastructure and methodology for conducting questions and answers with deferred type evaluation provides the following advantages: the LAT is not an element of an ontology, instead it serves as a "ontological marker" (or descriptor), and therefore is not restricted to a pre-computed relatively small number of categories; it allows the use of LATs with several modifiers (e.g., "19th century president" "bald movie star"); can leverage an existing ontology, but can also provide a flexible adaptation to gaps in existing ontologies; can leverage multiple different knowledge sources, including unstructured and semi-structured, in addition to structured (e.g., ontologies); answers are provided with increased level of confidence; a continuous probabilistic confidence measure based on the degree of match can be introduced; and machine learning can be applied to analyze the system's performance and optimize a LAT matching mechanism based on e.g. properties of partial match, no match, or fully match.

Thus, in one aspect of the invention there is provided a computer-implemented method of generating answers to questions based on any corpus of data in a system, the computer-implemented method comprising:

receiving an input query; and performing an automated query analysis including determining the lexical answer type;

automatically computing candidate answers to the input query using said corpus of data;

computing one or more lexical types (LAT) for each candidate answer;

using an automated scoring function comparing candidate answer lexical types to the query LAT and producing a score for each candidate answer; and, returning one or more answers based on the produced scores for delivery to a user.

BRIEF DESCRIPTION OF THE DRAWINGS

The objects, features and advantages of the invention are understood within the context of the Description of the Preferred Embodiment, as set forth below. The Description of the Preferred Embodiment is understood within the context of the accompanying drawings, which form a material part of this disclosure, wherein.

DETAILED DESCRIPTION OF THE PREFERRED EMBODIMENTS

As will be referred to herein, the word "question" and "query," and their extensions, are used interchangeably and refer to the same concept, namely request for information. Such requests are typically expressed in an interrogative sentence, but they can also be expressed in other forms, for example as a declarative sentence providing a description of an entity of interest (where the request for the identification of the entity can be inferred from the context). "Structured information" (from "structured information sources") is defined herein as information whose intended meaning is unambiguous and explicitly represented in the structure or format of the data (e.g., a database table). "Unstructured information" (from "unstructured information sources") is defined herein as information whose intended meaning is only implied by its content (e.g., a natural language document). By "Semi structured" it is meant data having some of the meaning explicitly represented in the format of the data, for example a portion of the document can be tagged as a "title".

Figure 1:
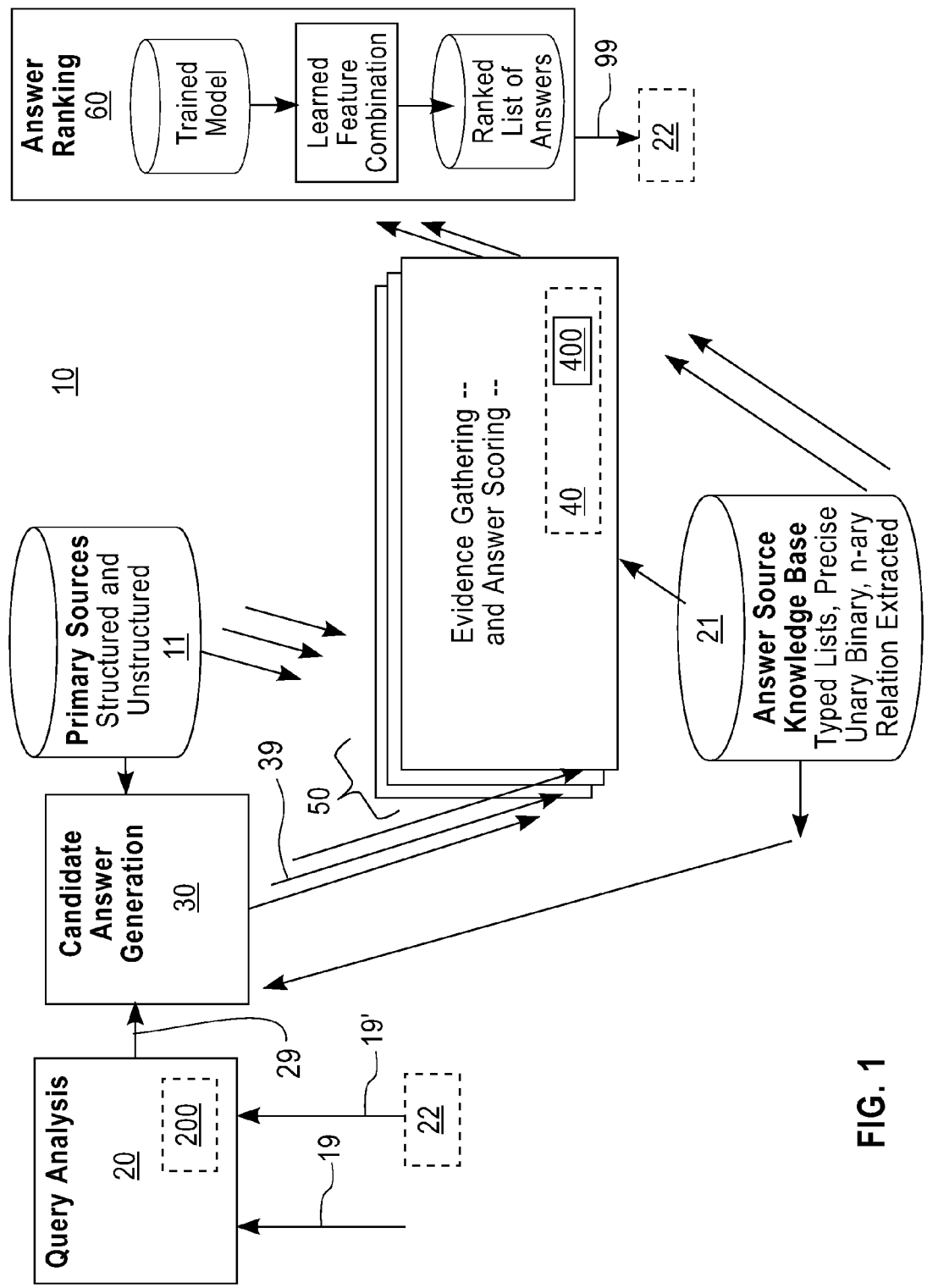
FIG. 1 shows a system diagram depicting a high level logical architecture and question/answering method for of the present invention.

FIG. 1 shows a system, diagram depicting a high-level logical architecture 10 and methodology of the present invention. As shown in FIG. 1, the high level logical architecture 10 includes the provision of a Query Analysis module 20 implementing functions for receiving and analyzing a user query or question. According to the invention, in one embodiment, a "user" refers to a person or persons interacting with the system, and the term "user query" refers to a query (and its context) 19 posed by the user. However, it is understood other embodiments can be constructed, where the term "user" refers to a computer system 22 generating a query by mechanical means, and where the term "user query" refers to such a mechanically generated query and context 19'. A candidate answer generation module 30 is provided to implement search for candidate answers by traversing structured, semi structured and unstructured sources contained in a Primary Sources module 11 and in an Answer Source Knowledge Base module 21 containing collections of relations and lists extracted from primary sources. All the sources of information can be locally stored or distributed over a network, including the Internet. The Candidate Answer generation module 30 generates a plurality of output data structures containing candidate answers based upon the analysis of retrieved data. In FIG. 1, a first embodiment is depicted that includes an Evidence Gathering module 50 interfacing with the primary sources 11 and knowledge base 21 for concurrently analyzing the evidence based on passages having candidate answers, and scoring each of candidate answers, in one embodiment, as parallel processing operations. In one embodiment, the architecture may be employed utilizing the Common Analysis System (CAS) candidate answer structures as will be described in greater detail herein below. This processing is depicted in FIG. 1 where the Evidence Gathering module 50 comprises a Candidate Answer Scoring module 40 for analyzing a retrieved passage and scoring each of candidate answers of a retrieved passage. The Answer Source Knowledge Base 21 may comprise one or more databases of structured or semi-structured sources (pre-computed or otherwise) comprising collections of relations (e.g., Typed Lists). In an example implementation, the Answer Source knowledge base may comprise a database stored in a memory storage system, e.g., a hard drive. An Answer Ranking module 60 provides functionality for ranking candidate answers and determining a response 99 returned to a user via a user's computer display interface (not shown) or a computer system 22, where the response may be an answer, or an elaboration of a prior answer or request for clarification in response to a question—when a high quality answer to the question is not found.

More particularly, FIG. 1 shows a machine learning implementation where the "answer ranking" module 60 includes a trained model component 70 produced using a machine learning techniques from prior data. The prior data may encode information on features of candidate answers, the features of passages the candidate answers come, the scores given to them by Candidate Answer Scoring modules 40, and whether the candidate answer was correct or not. In other words, machine learning algorithms can be applied to the entire content of the CASes together with the information about correctness of the candidate answer. Such prior data is readily available for instance in technical services support functions, or in more general setting on Internet, where many websites list questions with correct answers. The model encodes a prediction function which is its input to the "Learned Feature Combination" module shown in FIG. 1.

It is understood that skilled artisans may implement a further extension to the system of the invention shown in FIG. 1, to employ one or more modules for enabling I/O communication between a user or computer system and the system 10 according to, but not limited to: the following modalities of text, audio, video, gesture, tactile input and output etc. Thus, in one embodiment, both an input query and a generated query response may be provided in accordance with one or more of multiple modalities including text, audio, image, video, tactile or gesture. Thus, for example, if a question is posed using other modalities, e.g. a series of images pointed by the user, the invention applies to the textual aspects of the images, captured in their descriptions or inferred by an analysis system (not shown).

This processing depicted in FIG. 1, may be local, on a server, or server cluster, within an enterprise, or alternately, may be distributed with or integral with or otherwise operate in conjunction with a public or privately available search engine in order to enhance the question answer functionality in the manner as described. Thus, the invention may be provided as a computer program products comprising instructions executable by a processing device, or as a service deploying the computer program product. The architecture employs a search engine (a document retrieval system) as a part of Candidate Answer Generation module 30 which may be dedicated to the Internet, a publicly available database, a web-site (e.g., IMDB.com) or, a privately available database. Databases can be stored in any storage system, e.g., a hard drive or flash memory, and can be distributed over the network or not.

As mentioned, the invention makes use of the Common Analysis System (CAS), a subsystem of the Unstructured Information Management Architecture (UIMA) that handles data exchanges between the various UIMA components, such as analysis engines and unstructured information management applications. CAS supports data modeling via a type system independent of programming language, provides data access through a powerful indexing mechanism, and provides support for creating annotations on text data, such as described in (http://www.research.ibm.com/journal/sj/433/gotz.html) incorporated by reference as if set forth herein. It should be noted that the CAS allows for multiple definitions of the linkage between a document and its annotations, as is useful for the analysis of images, video, or other non-textual modalities (as taught in the herein incorporated reference U.S. Pat. No. 7,139,752).

In one embodiment, the UIMA may be provided as middleware for the effective management and interchange of unstructured information over a wide array of information sources. The architecture generally includes a search engine, data storage, analysis engines containing pipelined document annotators and various adapters. The UIMA system, method and computer program may be used to generate answers to input queries. The method includes inputting a document and operating at least one text analysis engine that comprises a plurality of coupled annotators for tokenizing document data and for identifying and annotating a particular type of semantic content. Thus it can be used to analyze a question and to extract entities as possible answers to a question from a collection of documents.

In one non-limiting embodiment, the Common Analysis System (CAS) data structure form is implemented as is described in commonly-owned, issued U.S. Pat. No. 7,139,752, the whole contents and disclosure of which is incorporated by reference as if fully set forth herein and described in greater detail herein below.

As further shown in greater detail in the architecture diagram of FIG. 1, the "Query Analysis" module 20 receives an input that comprises the query 19 entered, for example, by a user via their web-based browser device. An input query 19 may comprise a string such as "Who was the tallest American president?". Alternately, a question may consist of a string and an implicit context, e.g., "Who was the shortest?". In this example, context may range from a simple another string e.g. "American presidents" or "Who was the tallest American president?" to any data structure, e.g. all intermediate results of processing of the previous strings—a situation arising e.g., in a multiple turn dialog. The input query is received by the Query Analysis module 20 which includes, but is not limited to, one or more the following sub-processes: A Parse and Predicate Argument Structure block (not shown) that implements functions and programming interfaces for decomposing an input query into its grammatical and semantic components, e.g., noun phrases, verb phrases and predicate/argument structure. An (English Slot Grammar) ESG-type parser may be used to implement parsing, in one embodiment; A Focus Segment, Focus & Modifiers block is provided that computes the focus and focus modifiers of the question. Further implementations may further include a Question decomposition block (not shown) in the query analysis module 20 that implements functions and programming interfaces for analyzing the input question to determine the sets of constraints specified by the question about the target answer. In accordance with the invention, the query analysis block 20 includes additionally a Lexical Answer Type (LAT) block 200 that implements functions and programming interfaces to provide additional constraints on the answer type (LAT). The computation in the block 20 comprises but is not limited to the Lexical Answer Type.

Thus, the invention leverages the concept of "Lexical Answer Type" (LAT) not the "ontological answer type". While the two are related, ontologies are typically predefined (and finite), the LATs are computed from a natural language analysis of the query and provide more a description of an answer than its ontological category.

In FIG. 1, the LAT block 200 includes certain functions/sub-functions (not shown) to determine the LAT. These sub-functions, in one embodiment, include a parser such as the ESG parser as described herein above, and, a co-reference resolution module (as described e.g. in http://www.isi.edu/~hobbs/muc5-generic-final.pdf; and http://gate.ac.uk/sale/taln02/taln-ws-coref.pdf).

The certain functions/sub-functions operate to compute a LAT from a natural language analysis of the query and provide more a description of an answer than its ontological category. Thus, for example, the italicized words in the following sentence represent the LAT "After circumnavigating the Earth, which *explorer* became *mayor* of Plymouth, England?" the answer must include both "explorer" and "mayor"; and these two strings become the question LATs.

As mentioned above, a LAT of the question/query is the type (i.e. the descriptor) of the referent of the entity that is a valid answer to the question. In practice, LAT is the descriptor of the answer detected by a natural language understanding module (not shown) comprising a collection of patterns or a parser with a semantic interpreter.

It is understood that additional functional blocks such as a Lexical and Semantic Relations module to detect lexical and semantic relations in the query; a Question Classification block that may employ topic classifiers providing information addressing, and, a Question Difficulty module executing methods providing a way to ascertain a question's difficulty may be included in the query analysis module 20 as described in herein incorporated commonly-owned, co-pending U.S. patent application Ser. No. 12/152,441.

With reference to the Lexical Answer Type (LAT) block 200, in the query analysis module 20 of FIG. 1, the LAT represents the question terms that identify the semantic type of the correct answer. As is known, a LAT may be detected in a questions through pattern rules such as "any noun phrase that follows the wh-word and serves as the subject or the object of the main verb in a question is a LAT". For example, in question "Which Dublin-born actor once married Ellen Barkin?", the noun phrase "Dublin-born actor" follows the wh-word "which", and is the subject of the main verb, "marry". LAT detection rules can be encoded manually or learned by machine automatically through association rule learning. In this case the natural language understanding moduel can be limited to implementation the simple rules as described above.

LATs should include modifiers of the main noun if they change its meaning. For example, a phrase "body of water" has different meaning than "water" or "body", and therefore in the following query the LAT has to include the whole phrase (italicized):

"Joliet and Co found that the Mississippi emptied into what body of water?"

It is understood that multiple LATs can be present in the query and the context, and can even be present in the same clause. For example, words italicized represent the LAT in the following queries:

"In 1581, a year after circumnavigating the Earth, which explorer became mayor of Plymouth, England?"

"Which New York City river is actually a tidal strait connecting upper New York Bay with Long Island Sound?"

Even though in many cases the LAT of the question can be computed using simple rules as described herein above, in other situations such as when multiple LATs are present, in the preferred embodiment, the LATs are computed based on grammatical and predicate argument structure. Thus the natural language understanding module should include a parser (such as ESG is used to compute the grammatical structures) and a shallow semantic interpreter to compute the semantic coreference between the discourse entities, such as "river" and "tidal strait" or "explorer" and "mayor" to add both of them to the list of LATs. It is understood that the LATs can include modifiers.

Thus, in the first example above, the list of LATs may be contain [explorer,mayor, mayor of Plymouth, mayor of Plymouth, England]. A minimal possible noun phrase that identifies the answer type corresponds to the maximal entity set, and the maximal noun phrase provides the best match.

In one example implementation, a LAT is used without modifiers for better coverage: e.g., it is easier to figure out someone is an author than a 20th-century French existentialist author. Matching a LAT including modifiers of the head noun produces a better match, but typically requires a large set of sources. From the above, it should be clear that a LAT is not an ontological type but a marker Semantically, it is a unary predicate that the answer needs to satisfy. Since multiple LATs are the norm, and matches between candidate LATs and query LAT are usually partial, a scoring metric is often used, where the match on the LATs with modifiers is preferred to the match on simple head noun.

Figure 2:
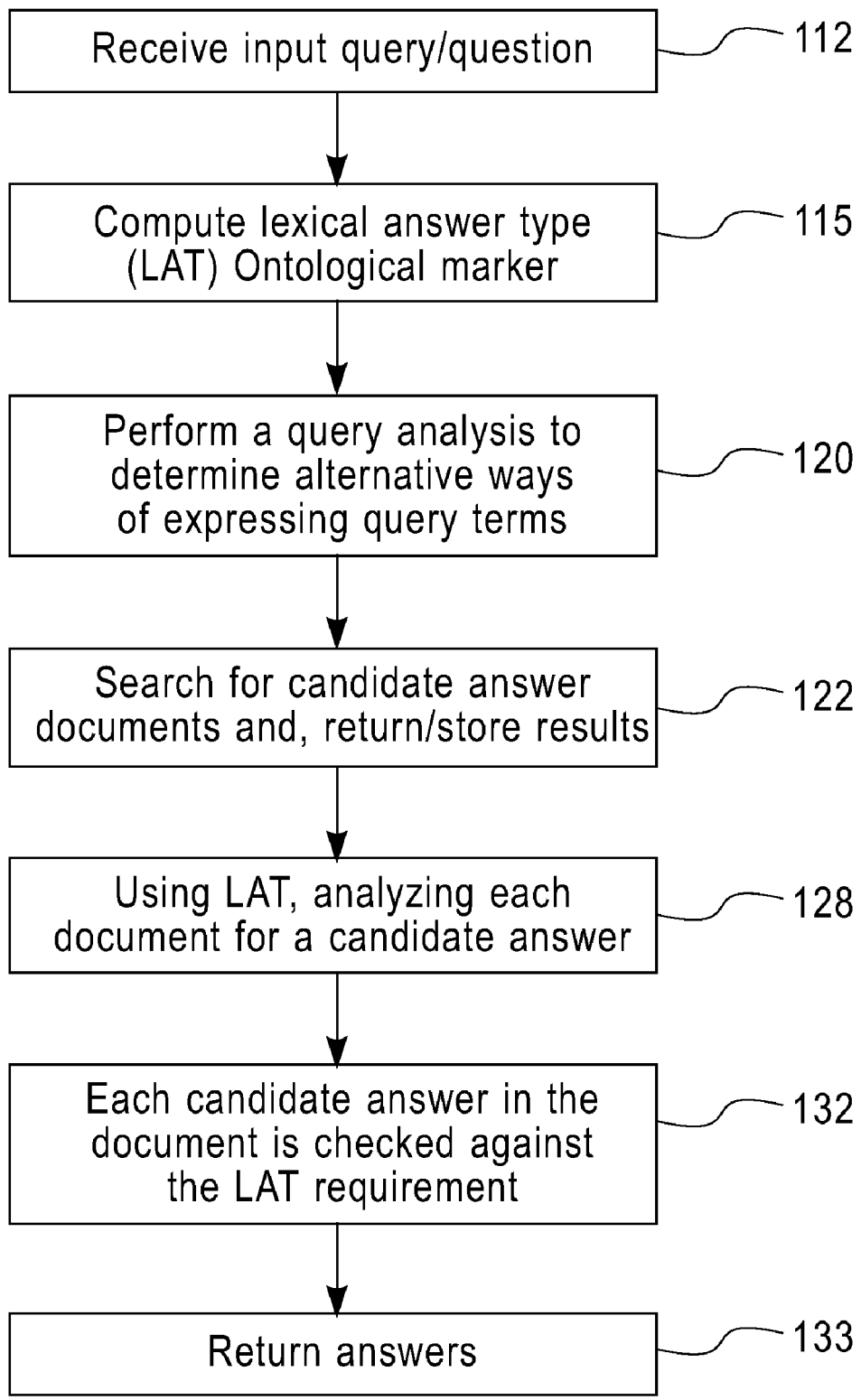
FIG. 2 is an example flow diagram for conducting questions and answers with deferred type evaluation as employed by the present invention.

The method of "deferred type evaluation", in one embodiment of the invention, is now described with reference to the flow chart 100 as depicted in FIG. 2. With respect to FIG. 2, a first processing step 100 represents the step of receiving an input query, and generating a data structure, e.g., a CAS structure, including a question string and context for input to the Lexical Answer Type (LAT) block 200 (FIG. 1) where, as indicated at step 115, the Query is analyzed and lexical answer type (LAT) is computed. As a further example provided herein only for non-limiting purposes of discussion, an input query, to with:

"which 19th century US presidents were assassinated?" would compute an lexical answer type (LAT) as "19th century US president" (but also as "US president" and "president").

As a result of processing in the LAT block 200, as typified at step 115, there is generated an output data structure, e.g., a CAS structure, including the computed LAT and additional terms from the original question.

For example, alternately, or in addition, as represented at step 120, FIG. 2, the functional modules of the query analysis block 20 may produce alternative ways of expressing terms. For example, an alternative way, or a pattern, of expressing "19th century", e.g., will include looking for a string "18\d\d" where \d stands for a digit, "XIXth ce." etc. Thus, the query analysis block may investigate presence of synonyms in query analysis. Note the lists of synonyms for each date category is either finite or can be represented by a regular expression)

Further, it is understood that while "president" (which is a more general category) and "US president" form a natural ontology, the additional modifiers: "19th century" as in this example, or "beginning of the XXth century" are unlikely to be part of an existing ontology. Thus, the computed LAT, at step 115, FIG. 2, serves as a "ontological marker" (descriptor) which can be but doesn't have to be mapped into an ontology.

As result of processing in the LAT block 200 then, as typified at step 120, there is generated an output data structure, e.g., a CAS structure, including the computed the original query (terms, weights) (as described in the co-pending U.S. patent application Ser. No. 12/152,441.

Referring back to FIG. 1, an output 29 of the Question/Query analysis block 20 comprises a query analysis result data structure (CAS structure). In this embodiment, an output data structure Question/Query analysis module 20 and candidate answer generation module 30 may be implemented to pass the data among the modules, in accordance with the UIMA Open Source platform.

As further described with respect to FIG. 1, there shown the "Candidate Answer Generation" module 30 that receives the CAS-type query results data structure 29 output from the Question/Query analysis block 20, and generates a collection of candidate answers based on documents stored in Primary Sources 11 and in Answer Source KB 21. The "Candidate Answer Generation" module 30 includes, but is not limited to, one or more of the following functional sub-processing modules: A Term Weighting & Query Expansion module implementing functions for creating a query against modules 11 and 21 (part of query generation) with an embodiment implementing query expansion (see, e.g., http://en.wilipedia.org/wiki/Query_expansion); a Document Titles (Document Retrieval in Title Sources) module implementing functions for detecting a candidate answer (from sources 11 and 21); an Entities From Passage Retrieval module implementing functions for detecting a candidate answer in textual passages, e.g. based on grammatical and semantic structures of the passages and tie query; and, an KB Entities from Structured Sources module implementing functions for retrieving a candidate answer based on matches between the relations between the entities in the query and the entities in Answer Source KB 21, (implemented, e.g., as an SQL query).Referring to FIG. 1, as a result of implementing the functional modules of the Candidate Answer Generation block 30, a query is created and run against all of the structured and unstructured primary data sources 11 in the (local or distributed) sources database or like memory storage device(s). This query is run against the structured (KB), semi-structured (e.g., Wikipedia, IMDB databases, a collection of SEC filings in XBRL, etc.), or unstructured data (text repositories) to generate a candidate answer list 39 (also as a CAS, or an extension of prior CAS). It should be understood that, in one embodiment, the query is run against a local copy of the listed primary source databases, or, may be access the publically available public database sources. Moreover, it should be understood that, in one embodiment, not all terms from the query need to be used for searching the answer—hence the need for creating the query based on results of the query analysis. E.g. "five letter previous capital of Poland"—the terms "five letter" should not be part of the query.

As further shown in FIG. 1, the Answer Source Knowledge Base 21 is provided and shown interfacing with the Entities from Structured Sources module 310 that includes: Typed Lists (e.g., list of all countries in world), Precise Unary (e.g., a country), Binary (e.g., country+head of state of country), Ternary (e.g., country+head of state of country+wife of head of state), n-ary Relation Extracted, etc.

Returning to FIG. 2, at processing step 122, there is performed the step of searching for candidate answer documents, and returning the results. Thus, for the example query described above ("which 19th century US presidents were assassinated?") the following document including candidate answer results may be returned, e.g., http://en.wikipedia.org/wiki/List_of United_States_Presidential_assassination_attempts, http://www.museumspot.com/know/assassination.htm, http://www.presidentsusa.net/presvplist.html As a result of processing in the candidate answer generation module 30, as typified at step 122, there is generated an output data structure 39, e.g., a CAS structure, including all of the documents found from the data corpus (e.g., primary sources and knowledge base).

Referring back to FIG. 2, step 128, there is depicted the step of analyzing each document for a candidate answer to produce a set of candidate answers which may be output as a CAS structure using LAT (the lexical answer type).

For the example questions discussed herein, as a result of processing in the candidate answer generation module 30, as typified at step 132, FIG. 2, those candidate answers that are found will be returned as answer(s): e.g., Abraham Lincoln, James A. Garfield.

The final answer is computed in the steps described above, based on several documents. One of the documents, http://www.museumspot.com/know/assassination.htm, states that "Four presidents have been killed in office: Abraham Lincoln, James A. Garfield, William McKinley and John F. Kennedy".

Another article, http://en.wikipedia.org/wiki/List_of_United_States_Presidential_assassination_attempts, says: This is a list of U.S. Presidential assassination attempts [ . . . ] [ . . . ]

The Abraham Lincoln assassination, took place on Good Friday, Apr. 14, 1865, at approximately 10 p.m. President Abraham Lincoln was shot by actor and Confederate sympathizer John Wilkes Booth while attending a performance of Our American Cousin at Ford's Theatre with his wife and two guests. Lincoln died the following day—Apr. 15, 1865—at 7:22 a.m., in the home of William Petersen. [ . . . ]

The assassination of James A. Garfield took place in Washington, D.C. on Jul. 2, 1881.[ . . . ] [ . . . ]

The assassination of William McKinley took place on Sep. 6, 1901, . . . [ . . . ]

The assassination of John F. Kennedy took place on Friday, Nov. 22, 1963, [ . . . ]

Figure 3:
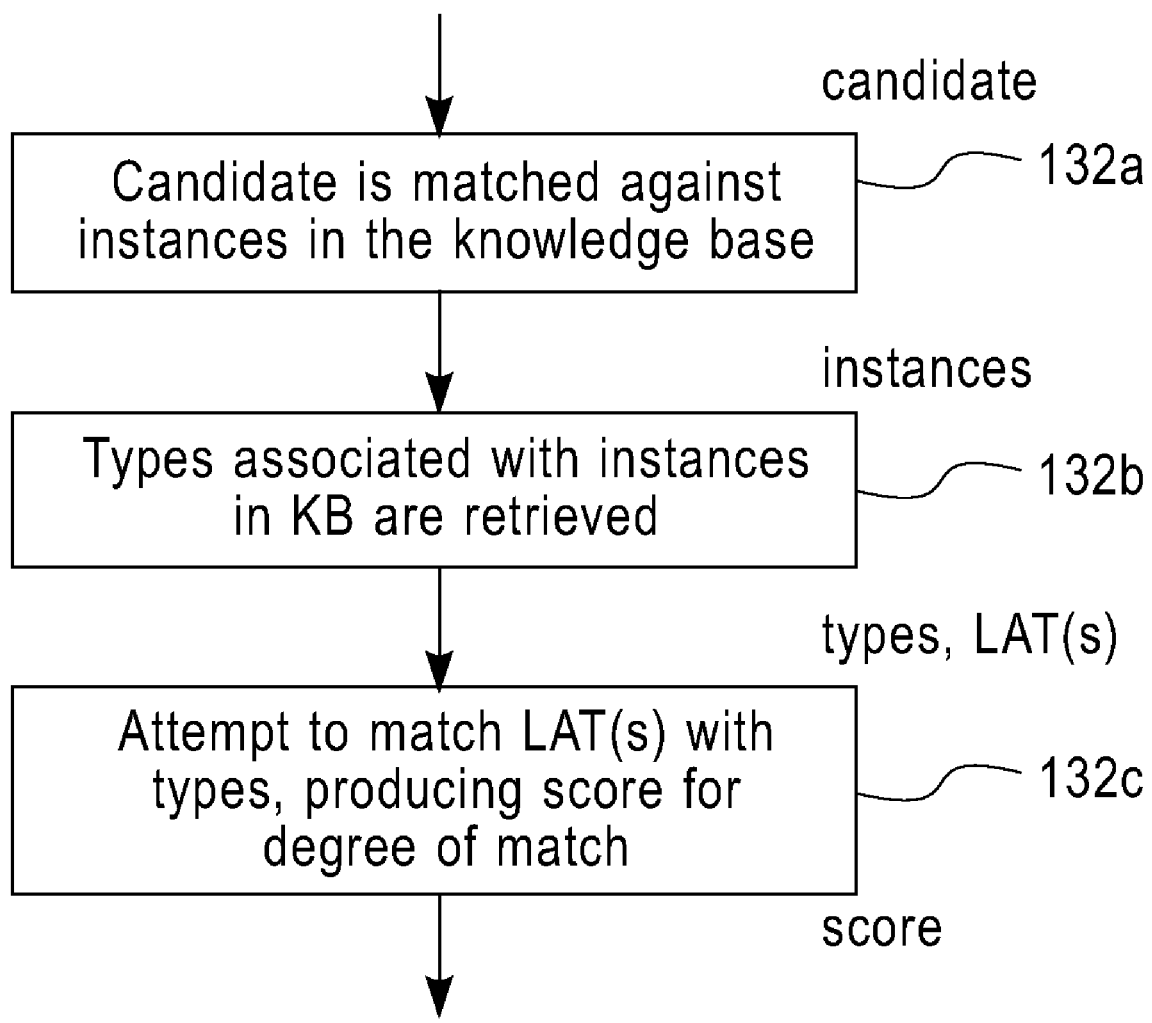
FIG. 3 is an example flow diagram elaborating on the details of score production performed at step 132 of the flow diagram of FIG. 2; and, FIG. 4 depicts an aspect of a UIMA framework implementation for providing one type of analysis engine for processing CAS data structures.

In particular, as shown in FIG. 3, step 132 implements the following steps: for each candidate answer received, matching the candidate against instances in the database (step 132a) which results in generating an output data structure, e.g., a CAS structure, including the matched instances; retrieving types associated with those instances in the knowledge base (KB) (step 132b); and, at step 132c attempting to match LAT(s) with types, producing a score representing the degree of match.

Thus continuing the above example, the parser, semantic analyzer, and pattern matcher—mentioned above in the discussion of query analysis—are used (in the preferred embodiment) to identify the names of the presidents, and decide that only the first two qualify as "XIXth century".

More particularly, the candidate and LAT(s) are represented as lexical strings. Production of the score, referred to herein as the "TyCor" (Type Coercion) score, is comprised of three steps: candidate to instance matching, instance to type association extraction, and LAT to type matching. The score reflects the degree to which the candidate may be "coerced" to the LAT, where higher scores indicate a better coercion.

In candidate to instance matching, the candidate is matched against an instance or instances within the knowledge resource, where the form the instance takes depends on the knowledge resource. With a structured knowledge base, instances may be entities, with an encyclopedic source such as Wikipedia instances may be entries in the encyclopedia, with lexical resources such as WordNet (lexical database) instances may be synset entries (sets of synonyms), and with unstructured document (or webpage) collections, instances may be any terms or phrases occurring within the text. If multiple instances are found, a rollup using an aggregation function is employed to combine the scores from all candidates. If no suitable instance is found, a score of 0 is returned.

Next, instance association information is extracted from the resource. This information associates each instance with a type or set of types. Depending on the resource, this may take different forms; in a knowledge base, this corresponds to particular relations of interest that relate instances to types, with an encyclopedic source, this could be lexical category information which assigns a lexical type to an entity, with lexical resources such as WordNet, this is a set of lexical relations, such as hyponymy, over synsets (e.g. "artist" isa "person"), and with unstructured document collections this could be co-occurrence or proximity to other terms and phrases representing type.

Then, each LAT is then attempted to match against each type. A lexical manifestation of the type is used. For example, with encyclopedias, this could be the string representing the category, with a lexical resource such as WordNet, this could be the set of strings contained within the synset. The matching is performed by using string matching or additional lexical resources such as Wordnet to check for synonymy or hyponymy between the LAT and type. Special logic may be implemented for types of interest; for example person matcher logic may be activated which requires not a strict match, synonym, or hyponym relation, but rather that both LAT and type are hyponyms of the term "person". In this way, "he" and "painter", for example, would be given a positive score even though they are not strictly synonyms or hyponyms. Finally, the set of pairs of scores scoring the degree of match may be resolved to a single final score via an aggregation function.

Thus, in implementation set forth in steps 132a-132c of FIG. 3, for the example question described herein, each candidate answer in the document is automatically checked against the LAT requirement of "US president" and "19th century"|"18\d\d"|"XIXth ce.""(where the vertical bar stands for disjunction). This may be performed by the Candidate Answer Scoring block 40, shown in FIG. 1, as part of the evidence gathering module 50, and particularly, a Candidate Answer Type Analysis module 400 that produces a probability measure that Candidate Answer is of the correct type based, e.g., on a grammatical and semantic analysis of the document with which the Candidate Answer appears. In one embodiment, this processing entails using an automated scoring function that compares candidate answer lexical types (LAT) to the query LAT and producing a score for each candidate answer. The a scoring function can be expressed as a weighted combination of different typing scores, and, in one embodiment it may be expressed as $$TyCorScore=0.2.*TyCorWordNet+0.5*TyCorKB+0.4*TyCorDoc$$

This expresses the preferences for more organized sources such as knowledge bases (KB), followed by type matching in a retrieved document, and synonyms being least preferred way of matching types.

For the given examples with presidents, each candidate answer from the museumspot.com list would get a score of 0.4.*2 (matching US president); the correct candidate answers from Wikipedia would get 0.4.*3 (matching US president, and matching the pattern for $19^{th}$ century). The other scores would be zero (WordNet and TyCorKB).

Of course, other combinations of scores are possible, and the optimal scoring function can be learned as described in the co-pending U.S. patent application ser. No. 12/152,441.

The scoring function itself is a mathematical expression, that—in one embodiment—could be based on the logistic regression function (a composition of linear expressions with the exponential function), and may be applied to a much larger number of typing scores.

The output of the "Candidate Answer Scoring" module 40 is a CAS structure having a list of answers with their scores given by the processing modules in the answer scoring modules included in the Candidate Answer Scoring block 40 of the evidence gathering module 50. In one embodiment, these candidate answers are provided with TyCor matching score as described herein above.

This differs from previous (prior art) implementations utilizing a static ontology containing "president">"US president" because the list of presidents from every document could be extracted, and presented to the user: Abraham Lincoln, James A. Garfield, William McKinley and John F. Kennedy.

Finally, returning to FIG. 2, at step 133, the top candidate answers (based on their TyCor scores) are returned.

It is understood that, in one embodiment, a machine learning Trained Model and the Learned Feature Combination (block 70, FIG. 1) is implemented to: 1. Identify best answer among candidates; and, 2. Determine a confidence in the answer. In accordance with this processing, 1. Each question-candidate pair comprises an Instance; and, 2. LAT Scores are obtained from a wide range of features, e.g., co-occurrence of answer and query terms; whether LAT candidate matches answer LAT type (TyCor scores), etc. As described in the co-pending U.S. Patent Application No. 12/152,441, the Trained Model can be used to derive the optimal TyCor scoring function for LATs based on prior data.

The principles of the invention may be advantageously employed in applications of several vertical domains: domains where applications involving text analytics are growing, and where navigations through large amounts of data is becoming important. For instance, example domains may include, but is not limited to, e.g., biotech, finance, marketing, legal, etc. In one example implementation, the deferred type matching function performed by the invention may be applied for the management of medical data where the current state of the art, e.g., found in Published United States Patent Application U.S. 2002/018861 A1 is dictionary based methods that are inferior.

Moreover, the present invention may be extended to cover information seeking dialog, not just question answering. This has application both for spoken dialog, e.g., between man and machine (telephone, computer) and, e.g., for multimodal dialog using speech and text as described in U.S. Pat. No. 7,295,981, for example, that leverages both rule based approach to creating of dialog models or, a combination of statistical and rule based dialog modeling. As such, it does not permit context switching without a large degradation of performance. Deferred type matching as performed in accordance with the invention, should decrease degradation and allow context switching.

Yet in another embodiment, the present invention may be extended to cover information mining where data is often of poor quality but context should help, e.g., information extraction from meeting recordings.

As mentioned, in one embodiment, the above-described modules of FIG. 1 can be represented as functional components in UIMA is preferably embodied as a combination of hardware and software for developing applications that integrate search and analytics over a combination of structured and unstructured information. The software program that employs UIMA components to implement end-user capability is generally referred to as the application, the application program, or the software application.

The UIMA high-level architecture, one embodiment of which is illustrated in FIG. 1, defines the roles, interfaces and communications of large-grained components that cooperate to implement UIMA applications. These include components capable of analyzing unstructured source artifacts, such as documents containing textual data and/or image data, integrating and accessing structured sources and storing, indexing and searching for artifacts based on discovered semantic content.

Although not shown, a non-limiting embodiment of the UIMA high-level architecture includes a Semantic Search Engine, a Document Store, at least one Text Analysis Engine (TAE), at least one Structured Knowledge Source Adapter, a Collection Processing Manager, at least one Collection Analysis Engine, all interfacing with Application logic. In one example embodiment, the UIMA operates to access both structured information and unstructured information to generate candidate answers and an answer in the manner as discussed herein. The unstructured information may be considered to be a collection of documents, and can be in the form of text, graphics, static and dynamic images, audio and various combinations thereof.

Figure 4:
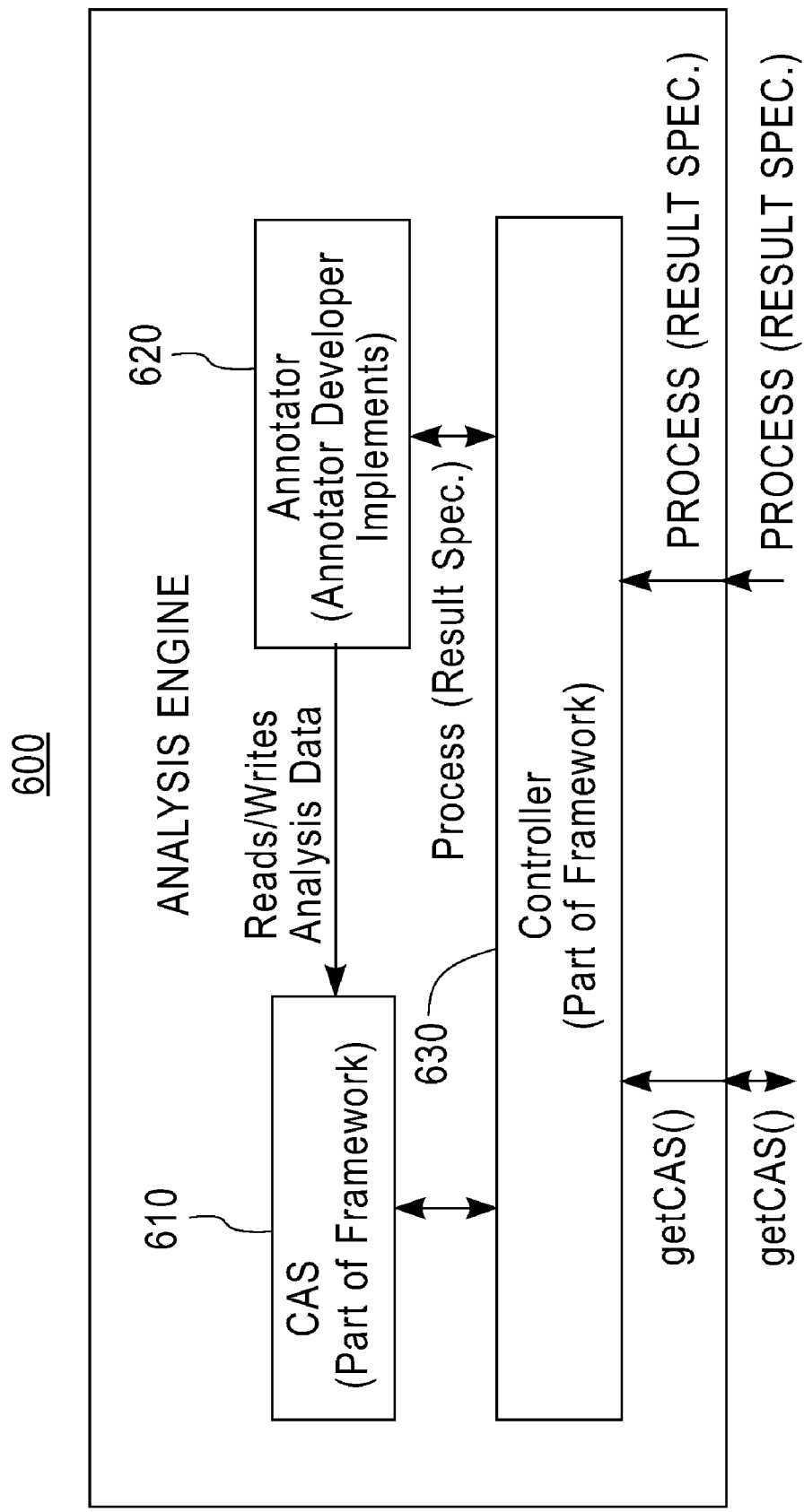

Aspects of the UIMA are further shown in FIG. 4, where there is illustrated a Analysis Engine (AE) 600 that can be a component part of the Text Analysis Engine (TAE). Included in the AE 600 is a Common Analysis System (CAS) 610, an annotator 620 and a controller 630. A second embodiment of a TAE (not shown) includes an aggregate Analysis Engine composed of two or more component analysis engines as well as the CAS, and implements the same external interface as the AE 600.

Common Analysis System 210

The Common Analysis System (CAS) 610 is provided as the common facility that all Annotators 620 use for accessing and modifying analysis structures. Thus, the CAS 610 enables coordination between annotators 620 and facilitates annotator 620 reuse within different applications and different types of architectures (e.g. loosely vs. tightly coupled). The CAS 210 can be considered to constrain operation of the various annotators.

The CAS 210 principally provides for data modeling, data creation and data retrieval functions. Data modeling preferably defines a tree hierarchy of (data) types, as shown in the example Table 2 provided below. The types have attributes or properties referred to as features. In preferred embodiments, there are a small number of built-in (predefined) types, such as integer (int), floating point (float) and string; UIMA also includes the predefined data type "Annotation". The data model is defined in the annotator descriptor, and shared with other annotators. In the Table 2, some "Types" that are considered extended from prior art unstructured information management applications to accommodate question answering in the preferred embodiment of the invention include:

TABLE 2

| TYPE (or feature) | TYPE's PARENT (or feature type) |
| --- | --- |
| Query Record | Top |
| Query | Query Record |
| Query Context | Query Record |
| Candidate Answer Record | Annotation |
| Candidate Answer | Candidate Answer Record |
| Feature: CandidateAnswerScore | Float |
| QueryLexical Answer Type | Annotation |
| CandidateAnswer LAT | Annotation |
| Feature: TyCorScore | Float |

In Table 2, for example, all of the question answering types (list in the left column) are new types and extend either another new type or an existing type (shown in the right column). For example, both Query and Query Context are kinds of Query Record, a new type; while Candidate Answer Record extends the UIMA type Annotation, but adds a new feature CandidateAnswerScore which is a Float. In addition, Table 2 describes the query LAT as having a UIMA Annotation type; CandidateAnswerLAT is also an Annotation, but with an additional feature TyCorScore of type Float.

CAS 610 data structures may be referred to as "feature structures." To create a feature structure, the type must be specified (see TABLE 2). Annotations (and—feature structures) are stored in indexes.

The CAS 610 may be considered to be a collection of methods (implemented as a class, for example, in Java or C++) that implements an expressive object-based data structure as an abstract data type. Preferably, the CAS 610 design is largely based on a TAE 130 Feature-Property Structure, that provides user-defined objects, properties and values for flexibility, a static type hierarchy for efficiency, and methods to access the stored data through the use of one or more iterators.

The abstract data model implemented through the CAS 210 provides the UIMA 100 with, among other features: platform independence (i.e., the type system is defined declaratively, independently of a programming language); performance advantages (e.g., when coupling annotators 210 written in different programming languages through a common data model); flow composition by input/output specifications for annotators 210 (that includes declarative specifications that allow type checking and error detection, as well as support for annotators (TAE) as services models); and support for third generation searching procedures through semantic indexing, search and retrieval (i.e. semantic types are declarative, not key-word based).

The CAS 210 provides the annotator 220 with a facility for efficiently building and searching an analysis structure. The analysis structure is a data structure that is mainly composed of meta-data descriptive of sub-sequences of the text of tie original document. An exemplary type of meta-data in an analysis structure is the annotation. An annotation is an object, with its own properties, that is used to annotate a sequence of text. There are an arbitrary number of types of annotations. For example, annotations may label sequences of text in terms of their role in the document's structure (e.g., word, sentence, paragraph etc), or to describe them in terms of their grammatical role (e.g., noun, noun phrase, verb, adjective etc.). There is essentially no limit on the number of, or application of, annotations. Other examples include annotating segments of text to identify them as proper names, locations, military targets, times, events, equipment, conditions, temporal conditions, relations, biological relations, family relations or other items of significance or interest.

Typically an Annotator's 220 function is to analyze text, as well as an existing analysis structure, to discover new instances of the set of annotations that it is designed to recognize, and then to add these annotations to the analysis structure for input to further processing by other annotators 220.

In addition to the annotations, the CAS 610 of FIG. 4 may store the original document text, as well as related documents that may be produced by the annotators 620 (e.g., translations and/or summaries of the original document). Preferably, the CAS 610 includes extensions that facilitate the export of different aspects of the analysis structure (for example, a set of annotations) in an established format, such as XML.

More particularly, the CAS 610 is that portion of the TAE that defines and stores annotations of text. The CAS API is used both by the application and the annotators 620 to create and access annotations. The CAS API includes, preferably, at least three distinct interfaces. A Type system controls creation of new types and provides information about the relationship between types (inheritance) and types and features. One non-limiting example of type definitions is provided in TABLE 1. A Structure Access Interface handles the creation of new structures and the accessing and setting of values. A Structure Query Interface deals with the retrieval of existing structures.

The Type system provides a classification of entities known to the system, similar to a class hierarchy in object-oriented programming. Types correspond to classes, and features correspond to member variables. Preferably, the Type system interface provides the following functionality: add a new type by providing a name for the new type and specifying the place in the hierarchy where it should be attached; add a new feature by providing a name for the new feature and giving the type that the feature should be attached to, as well as the value type; and query existing types and features, and the relations among them, such as "which type(s) inherit from this type".

Preferably, the Type system provides a small number of built-in types. As was mentioned above, the basic types are int, float and string. In a Java implementation, these correspond to the Java int, float and string types, respectively. Arrays of annotations and basic data types are also supported. The built-in types have special API support in the Structure Access Interface.

The Structure Access Interface permits the creation of new structures, as well as accessing and setting the values of existing structures. Preferably, this provides for creating a new structure of a given type; getting and setting the value of a feature on a given structure; and accessing methods for built-in types. Feature definitions are provided for domains, each feature having a range.

In an alternative environment, modules of FIGS. 1A-1B, 2A-2B can be represented as functional components in GATE (General Architecture for Text Engineering) (see: http://gate.ac.uk/releases/gate-2.0alpha2-build484/doc/userguide.html). Gate employs components which are reusable software chunks with well-defined interfaces that are conceptually separate from GATE itself All component sets are user-extensible and together are called CREOLE—a Collection of REusable Objects for Language Engineering. The GATE framework is a backplane into which plug CREOLE components. The user gives the system a list of URLs to search when it starts up, and components at those locations are loaded by the system. In one embodiment, only their configuration data is loaded to begin with; the actual classes are loaded when the user requests the instantiation of a resource.). GATE components are one of three types of specialized Java Beans: 1) Resource: The top-level interface, which describes all components. What all components share in common is that they can be loaded at runtime, and that the set of components is extendable by clients. They have Features, which are represented externally to the system as "meta-data" in a format such as RDF, plain XML, or Java properties. Resources may all be Java beans in one embodiment. 2) ProcessingResource: Is a resource that is runnable, may be invoked remotely (via RMI), and lives in class files. In order to load a PR (Processing Resource) the system knows where to find the class or jar files (which will also include the metadata); 3) LanguageResource: Is a resource that consists of data, accessed via a Java abstraction layer. They live in relational databases; and, VisualResource: Is a visual Java bean, component of GUIs, including of the main GATE gui. Like PRs these components live in class or jar files.

In describing the GATE processing model any resource whose primary characteristics are algorithmic, such as parsers, generators and so on, is modelled as a Processing Resource. A PR is a Resource that implements the Java Runnable interface. The GATE Visualisation Model implements resources whose task is to display and edit other resources are modelled as Visual Resources. The Corpus Model in GATE is a Java Set whose members are documents. Both Corpora and Documents are types of Language Resources(LR) with all LRs having a Feature Map (a Java Map) associated with them that stored attribute/value information about the resource. FeatureMaps are also used to associate arbitrary information with ranges of documents (e.g. pieces of text) via an annotation model. Documents have a DocumentContent which is a text at present (future versions may add support for audiovisual content) and one or more AnnotationSets which are Java Sets.

As UIMA, GATE can be used as a basis for implementing natural language dialog systems and multimodal dialog systems having the disclosed question answering system as one of the main submodules. The references, incorporated herein by reference above (U.S. Pat. Nos. 6,829,603 and 6,983,252, and 7,136,909) enable one skilled in the art to build such an implementation.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

In the preferred embodiment the term "user" refers to a person or persons interacting with the system, and the term "user query" refers to a query posed by the user. However other embodiments can be constructed, where the term "user" refers to the computer system generating a query by mechanical means, and where the term "user query" refers to such a mechanically generated query. In this context the "user query" can be a natural language expression, a formal language expression, or a combination of natural language and formal language expressions. The need for automated answering of a computer generated questions arises, for example, in the context of diagnosing failures of mechanical and electronic equipment, where the failing equipment can generate a query on the best way to fix a problem, and such a query could be answered by the system described in this invention based on a relevant corpus of textual data collected from the Internet. Methods of generating automatically natural language expressions from a formal representation have been previously disclosed, for example, in the U.S. Pat. Nos. 5,237,502 and 6,947,885, the contents and disclosures of each of which are incorporated by reference as if fully set forth herein and, can be used by the skilled in the art to create systems for automatically issuing a "user query". Similarly, in such a diagnostic scenario the system can ask an elaboration question, e.g. to query for some additional parameters.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A computer-implemented method of generating answers to questions based on a corpus of data comprising the steps of:
  receiving an input query;
  computing lexical answer types (LATs) for the input query;
  extracting candidate answers from the corpus; matching candidate answers to instances in a knowledge resource;
  matching instances to instance types in the knowledge resource;

matching LATs to instance types in the knowledge resource;

producing a type coercion score based on the matching steps, wherein the type coercion score reflects a degree that a candidate answer is coerced to a lexical answer type in order to eliminate the need for the lexical answer type to be part of a predetermined ontology; and returning a candidate answer based on the type coercion score.

2. The computer-implemented method of claim 1, wherein the input query comprises a string, a string with context, or a string with context wherein the context includes another string or data structure.

3. The computer-implemented method of claim 1, wherein said computing LATs includes implementing a detection rule for detecting said LAT in a question or a candidate answer.

4. The computer-implemented method of claim 1, wherein said computing LATs includes implementing a parser and/or semantic interpreter.

5. The computer-implemented method of claim 1, wherein the instance types and LATs comprise a lexical string, the matching is performed by using string matching.

6. The computer-implemented method of claim 1, wherein the instance types and LATs comprise a lexical string or a set of strings, the matching including checking for one or more of synonym or hyponym relation between the LAT and an instance type.

7. The computer-implemented method as claimed in claim 1, further comprising:
providing a previously obtained candidate answer ranking function operating on a collection of correctly scored examples by applying machine learning technique to a corpus of scored matching LAT type pairs.

8. The computer-implemented method of claim 1, wherein the step of returning the candidate answer is based on additional scores in addition to the type coercion score.

9. A system for generating answers to questions based on a corpus of data comprising:
a memory;
a processor device in communication with the memory that performs a method comprising: receiving an input query;
receiving an input query; computing lexical answer types (LATs) for the input query;
extracting candidate answers from the corpus; matching candidate answers to instances in a knowledge resource;
matching instances to instance types in the knowledge resource;
matching LATs to instance types in the knowledge resource;
producing a type coercion score based on the matching steps, wherein the type coercion score reflects a degree that a candidate answer is coerced to a lexical answer type in order to eliminate the need for the lexical answer type to be part of a predetermined ontology; and
returning a candidate answer based on the type coercion score.

10. The system as claimed in claim 9, wherein the instance types and LATs comprise a lexical string, the matching is performed by string matching.

11. The system as claimed in claim 9, wherein the instance types and LATs comprise a lexical string or a set of strings, said matching including checking for one of synonymy or hyponymy relation between the LAT and an instance type.

12. The system as claimed in claim 9, further comprising:
applying, by said processor device, a machine learning technique to a corpus of scored matching LAT and instance type pairs to provide a candidate answer ranking function.

13. The system of claim 9, wherein the step of returning the candidate answer is based on additional scores in addition to the type coercion score.

14. A non-transitory machine medium readable by a machine, tangibly embodying a program of instructions executable by the machine to perform method steps for generating
answers to questions based on a corpus of data, said method steps including the steps of:
receiving an input query; computing lexical answer types (LATs) for the input query;
extracting candidate answers from the corpus; matching candidate answers to instances in a knowledge resource; matching instances to instance types in the knowledge resource;
matching LATs to instance types in the knowledge resource; producing a type coercion score based on the matching steps, wherein the type coercion score reflects a degree that a candidate answer is coerced to a lexical answer type in order to eliminate the need for the lexical answer type to be part of a predetermined ontology; and
returning a candidate answer based on the type coercion score.

15. The non-transitory machine medium readable by a machine as claimed in claim 14, wherein said computing a LAT includes one of: implementing a detection rule for detecting said LAT in a question or a candidate answer, or implementing a parser and/or semantic interpreter.

16. The non-transitory machine medium readable by a machine of claim 14, wherein the instance types and LATs comprise a lexical string, the matching is performed by using string matching.

17. The non-transitory machine medium readable by a machine of claim 14, wherein the instance types and LATs comprise a lexical string or a set of strings, the matching including checking for one or more of synonym or hyponym relation between the LAT and a type.

18. The non-transitory machine medium readable by a machine as claimed in claim 14, wherein said returning the candidate answer is based on additional scores in addition to the type coercion score.

* * * * *